(12) United States Patent
Chen et al.

(10) Patent No.: US 10,249,939 B2
(45) Date of Patent: Apr. 2, 2019

(54) ANTENNA DEVICES

(71) Applicant: HEWLETT-PACKARD DEVELOPMENT COMPANY, L.P., Houston, TX (US)

(72) Inventors: Chun Chih Chen, Taipei (TW); Hung-Wen Cheng, Taipei (TW)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 59 days.

(21) Appl. No.: 15/035,073

(22) PCT Filed: Nov. 25, 2013

(86) PCT No.: PCT/US2013/071725
§ 371 (c)(1),
(2) Date: May 6, 2016

(87) PCT Pub. No.: WO2015/076849
PCT Pub. Date: May 28, 2015

(65) Prior Publication Data
US 2016/0276738 A1    Sep. 22, 2016

(51) Int. Cl.
*H01Q 1/24*    (2006.01)
*H04B 1/3827*    (2015.01)
(Continued)

(52) U.S. Cl.
CPC .......... *H01Q 1/245* (2013.01); *H01Q 1/2291* (2013.01); *H01Q 1/243* (2013.01); *H01Q 1/48* (2013.01); *H01Q 5/328* (2015.01); *H04B 1/3838* (2013.01)

(58) Field of Classification Search
CPC ........ H01Q 1/245; H01Q 1/2291; H01Q 1/48; H01Q 1/243; H01Q 5/328; H04B 1/3838
See application file for complete search history.

(56) References Cited

U.S. PATENT DOCUMENTS 7,218,224 B2   5/2007   Tokudome
8,421,685 B2   4/2013   Su et al.
(Continued)

FOREIGN PATENT DOCUMENTS

CN   2577453 Y   10/2003
EP   2650968     10/2013
(Continued)

OTHER PUBLICATIONS

Duff; "Designing Electronic Systems for EMC: Grounding for the Control of EMI", Jun. 11, 2011.
(Continued)

*Primary Examiner* — Dameon E Levi
*Assistant Examiner* — Ab Salam Alkassim, Jr.
(74) *Attorney, Agent, or Firm* — HPI Patent Department

(57) ABSTRACT

An antenna device for a signal having a frequency within an operation band comprises a ground element, a radiating element short-circuited to the ground element, a positive feed connected to the radiating element, and a ground feed coupled to the ground element by a capacitive element. The capacitive element is a substantially open circuit for signals having a frequency lower than the operation band. The capacitive element is a substantially short circuit for signals having a frequency within or higher than the operation band.

20 Claims, 3 Drawing Sheets

(51) Int. Cl.
*H01Q 5/328* (2015.01)
*H01Q 1/48* (2006.01)
*H01Q 1/22* (2006.01)

(56) References Cited

U.S. PATENT DOCUMENTS

| | | | | |
|---|---|---|---|---|
| 8,577,289 B2* | 11/2013 | Schlub | ............... | G01B 7/023 |
| | | | | 343/702 |
| 8,649,833 B1* | 2/2014 | Lee | ............... | H01Q 5/335 |
| | | | | 455/575.7 |
| 8,686,297 B2* | 4/2014 | Shiu | ............... | H05K 1/028 |
| | | | | 174/250 |
| 9,478,859 B1* | 10/2016 | Nair | ............... | H01Q 1/48 |
| 9,742,056 B2* | 8/2017 | Lagnado | ............... | G01R 27/2605 |
| 9,746,571 B2* | 8/2017 | Juan | ............... | H01Q 1/38 |
| 9,905,908 B2* | 2/2018 | Tang | ............... | H01Q 1/243 |
| 9,973,228 B2* | 5/2018 | Heikura | ............... | H04B 1/3838 |
| 2006/0033667 A1 | 2/2006 | Johnson | | |
| 2008/0088517 A1* | 4/2008 | Ansari | ............... | H01Q 1/38 |
| | | | | 343/745 |
| 2010/0001908 A1* | 1/2010 | Chen | ............... | H01Q 1/2266 |
| | | | | 343/700 MS |
| 2011/0012793 A1* | 1/2011 | Amm | ............... | H01Q 1/243 |
| | | | | 343/702 |
| 2011/0012794 A1* | 1/2011 | Schlub | ............... | H01Q 1/243 |
| | | | | 343/702 |
| 2011/0250928 A1* | 10/2011 | Schlub | ............... | H01Q 1/243 |
| | | | | 455/550.1 |
| 2011/0260939 A1 | 10/2011 | Korva et al. | | |
| 2012/0064843 A1 | 3/2012 | Kim et al. | | |
| 2012/0146865 A1* | 6/2012 | Hayashi | ............... | H01Q 9/42 |
| | | | | 343/750 |
| 2012/0214412 A1* | 8/2012 | Schlub | ............... | G01B 7/023 |
| | | | | 455/41.1 |
| 2012/0258772 A1* | 10/2012 | Brogle | ............... | G01D 5/2405 |
| | | | | 455/556.1 |
| 2012/0319918 A1* | 12/2012 | Ramachandran | .... | H01Q 9/0442 |
| | | | | 343/852 |
| 2012/0329524 A1* | 12/2012 | Kent | ............... | G06F 3/044 |
| | | | | 455/566 |
| 2013/0029625 A1* | 1/2013 | Park | ............... | H01Q 1/243 |
| | | | | 455/272 |
| 2013/0048347 A1* | 2/2013 | Shiu | ............... | H05K 1/028 |
| | | | | 174/254 |
| 2013/0127677 A1* | 5/2013 | Lin | ............... | H01Q 5/328 |
| | | | | 343/722 |
| 2013/0130633 A1* | 5/2013 | Lin | ............... | H01Q 1/245 |
| | | | | 455/127.1 |
| 2013/0278480 A1* | 10/2013 | McMilin | ............... | H01Q 1/243 |
| | | | | 343/904 |
| 2013/0285875 A1* | 10/2013 | Kawahata | ............... | H01Q 21/30 |
| | | | | 343/852 |
| 2014/0155000 A1* | 6/2014 | Erkens | ............... | H01Q 1/245 |
| | | | | 455/73 |
| 2014/0315606 A1* | 10/2014 | You | ............... | H04B 1/3838 |
| | | | | 455/575.5 |
| 2014/0333494 A1* | 11/2014 | Huang | ............... | H01Q 1/002 |
| | | | | 343/720 |
| 2015/0022403 A1* | 1/2015 | Lin | ............... | H01Q 1/243 |
| | | | | 343/702 |
| 2015/0116168 A1* | 4/2015 | Yosui | ............... | H01Q 7/00 |
| | | | | 343/722 |
| 2015/0145738 A1* | 5/2015 | Wong | ............... | H01Q 5/335 |
| | | | | 343/749 |
| 2015/0171911 A1* | 6/2015 | Yang | ............... | H04B 1/3838 |
| | | | | 455/280 |
| 2015/0200447 A1* | 7/2015 | Tang | ............... | H01Q 1/243 |
| | | | | 343/720 |
| 2015/0270619 A1* | 9/2015 | Zhu | ............... | G01V 3/00 |
| | | | | 343/702 |
| 2015/0311881 A1* | 10/2015 | Nagumo | ............... | H01Q 5/335 |
| | | | | 343/861 |
| 2015/0333403 A1* | 11/2015 | Wong | ............... | H01Q 5/50 |
| | | | | 343/857 |
| 2015/0372371 A1* | 12/2015 | Lagnado | ............... | H01Q 1/22 |
| | | | | 343/720 |
| 2016/0065260 A1* | 3/2016 | Heikura | ............... | H04B 1/3838 |
| | | | | 455/575.5 |
| 2016/0087343 A1* | 3/2016 | Chang | ............... | H01Q 1/245 |
| | | | | 343/720 |
| 2017/0125916 A1* | 5/2017 | Camacho | ............... | H01Q 19/005 |
| 2017/0160416 A1* | 6/2017 | Juan | ............... | H01Q 1/38 |
| 2018/0277951 A1* | 9/2018 | Nishikawa | ............... | H01Q 5/307 |

FOREIGN PATENT DOCUMENTS

| | | |
|---|---|---|
| KR | 10-2012-0037274 | 4/2012 |
| TW | 201308915 A1 | 2/2013 |

OTHER PUBLICATIONS

Wong, et al; "On-board: Printed Coupled-fed Loop Antenna in Close Proximity to the Surrounding Ground Plane for Penta-band WWAN Mobile Phone", Mar. 2011.

Korean Intellectual Property Office, International Search Report and Written Opinion for PCT/US2013/071725 dated Aug. 25, 2014 (12 pages).

* cited by examiner

ANTENNA DEVICES

BACKGROUND

Portable communication devices, such as mobile phones, are generally provided with multiple antennas, such as IEEE 802.11 (Wi-Fi), 3G, LTE and GPS antennas. Manufacturers of these devices aim to keep the devices as small as possible, and as a result, the space for antennas is limited.

BRIEF DESCRIPTION OF THE DRAWINGS

By way of non-limiting examples, antenna devices, communication devices and methods for wireless communication according to the present disclosure will be described with reference to the following drawings in which.

DETAILED DESCRIPTION

Figure 1:
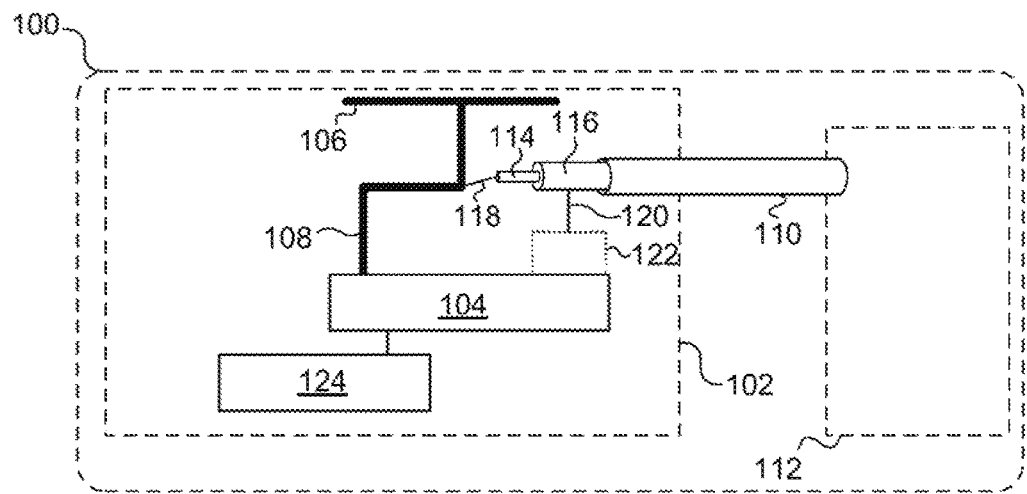
FIG. 1 is a plan view of a communication device.

The present disclosure describes an antenna device for a signal having a frequency within an operation band. The antenna device comprises a ground element, a radiating element short-circuited to the ground element, a positive feed connected to the radiating element and a ground feed. The ground feed is coupled to the ground element by a capacitive element. The capacitive element is a substantially open circuit for signals having a frequency lower than the operation band. The capacitive element is a substantially short circuit for signals having a frequency within or higher than the operation band.

Since the capacitive element is a substantially short circuit for signals having a frequency within or higher than the operation band, the capacitive element does not negatively influence the performance of the antenna device at the operation band. However, the capacitive element is a substantially open circuit for signals having a frequency lower than the operation band. There is a DC separation between the ground element and the ground feed and as a result, the ground element is floating. This has the advantage that the ground element can be used for a low frequency application without jeopardising the performance of the antenna device.

For example, the ground element can be coupled to a proximity sensor such that the ground element forms an electrode. This allows the proximity sensor to capacitively sense whether a moving object, such as the user's head, is in proximity of the electrode. Since the change in capacitance caused by the moving object is typically slow compared to typical operation bands, this low frequency change can be sensed using the ground element.

Government regulations, such as by the Federal Communications Commission (FCC) of the United States of America, limit the allowable amount of radiation energy that is absorbed by a user's body when using a communication device, such as a mobile phone. This energy is typically measured as the specific absorption rate (SAR). As a result of this limitation, the device limits the output power, which often results in a loss in quality of service, such as connection drop-outs, low data rate, poor reception, etc.

However, the device is not always close to the user's body, such as the user's ear. Instead, modern devices are often used with two hands and in front of the user, such as for browsing the Internet or reading emails. Since the absorption of radiation by the user's body decreases drastically over distance, in these scenarios the output power could be increased while still keeping the absorbed energy below the limit. This would enhance the user experience because the quality of service is increased.

In order to adaptively control the output power, the device has a proximity sensor that senses whether an object, such as the user's head, is in proximity, such as 2 cm of the device.

This proximity sensor can be an optical sensor that emits infrared light and senses reflected infrared light. If reflected light with an intensity larger than a threshold is detected, the sensor indicates to a power regulator that an object is present and the power regulator can reduce the output power.

Optical sensors cannot distinguish between different type of objects, such as a device cover and human tissue.

Another sensor type is a capacitive sensor which measures a change in capacitance between two electrodes. This capacitance depends on the permittivity $\varepsilon$ of the material within the electric field created by a voltage between the electrodes. Since the electric field is not restricted to the inside of the device but extends to the outside, the presence of an external object changes the permittivity $\varepsilon$ and therefore the capacitance. The sensor detects the change in capacitance and indicates that an object is present.

By distinguishing between different magnitudes of change the capacitive proximity sensor may be able to distinguish between body tissue and other materials, such as plastic covers.

However, the capacitive proximity sensor uses at least one sensing electrode which is difficult to integrate into devices that have typically no free space available.

Using an element of one of the antennas of the device as a sensing electrode has the advantage that the space required for the proximity sensor is reduced. Ground elements directly connected to a fixed ground potential, such as a cable shielding, are not suitable for capacitive measurement meaning they are not able to be used for a second purpose.

FIG. 1 illustrates a communication device 100, such as a mobile phone. The communication device 100 comprises an antenna device 102 including a ground element 104 and a radiating element 106 short-circuited to the ground element 104 by a shorting pin 108.

Without the shorting pin 108 the antenna would work as a dipole with two dipole elements 104 and 106 and including the shorting pin 108 introduces an additional inductance. Changing the length and width of the shorting pin 108, the impedance of the antenna can be matched.

The radiating element 106 may be an inverted-F element with one arm for each operating band. Typically, the length of each arm is $\lambda/4$ of the operating band. An operation band is defined as a frequency range in which the antenna device is designed to operate.

For example, Wi-Fi antenna devices according to the IEEE 802.11 standard typically have an operation band from 2.4 GHz to 2.5 GHz. Radiating element 106 may be designed for the lower end of that range of 2.4 GHz which results in a wavelength of $\lambda=12.5$ cm and $\lambda/4=3.125$ cm. The radiating element 106 may further have a second arm for signals with frequencies within a second Wi-Fi operation band of 5 GHz (from 4,915 MHz to 5,825 MHz) resulting in $\lambda=6$ cm and $\lambda/4=1.5$ cm.

An antenna cable 110 connects the antenna device 102 to an electronics module 112, which includes, for example, an antenna amplifier (not shown). The antenna cable 110 comprises a signal conductor 114 and a cable ground or shielding 116.

The antenna device 110 comprises a feed input 118 connected to the radiating element 106 and the signal conductor 118. The feed input 118 transfers the electrical signal from the signal conductor 114 to the radiating element 106, such that the radiating element 106 transmits the signal.

It is noted here that the principles explained with reference to sending the signal equally apply to receiving a signal because of the reciprocity of antennas in general.

The cable ground 116 is connected to a feed ground 120. The feed ground 120 may be a wire or other conductor and may also be identical to the antenna ground 116.

A coupling 122 is between the feed ground 120 and the ground element 104. The coupling 122 forms a frequency selective connection between the feed ground 120 and the ground element 104. This allows the ground element 104 to be used as an antenna ground for radiating element 106 using relatively high frequencies while at the same time the ground element 104 is floating and therefore, can be used for a second low-frequency purpose.

One example of that second low frequency purpose is proximity sensing by a proximity sensor 124. Proximity sensor 124 measures the capacitance of the ground element 104. When this capacitance changes the proximity sensor 124 senses that an object is in the proximity of the device 100. The changes in capacitance are slow and therefore, this is an appropriate second use for ground element 104.

In one example, the proximity sensor 124 is a capacitive sensor model no. STM8T143 by ST Microelectronics. In this example, proximity sensor 124 uses a ProxSense™ charge transfer capacitive acquisition method by Azoteq, which allows proximity sensor 124 to sense the proximity using the ground element 104 as a single electrode. In other examples, the proximity sensor 124 measures a capacitance between the ground element 104 and a second electrode (not shown).

To facilitate the frequency selective connection, coupling 122 suppresses signals having a frequency lower than the operation band of the antenna device 102 from being transmitted between the feed ground 120 and the ground element 104. At the same time, coupling 122 transmits signals having a frequency within or higher than the operation band of the antenna device 102. The coupling may be realised using capacitors as explained below with reference to FIG. 2.

Figure 2:
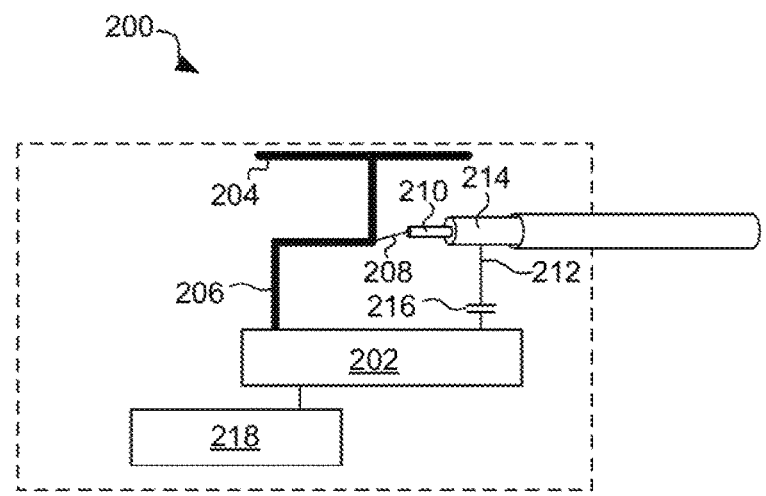
FIG. 2 is a plan view of an antenna device.

FIG. 2 illustrates an antenna device 200 for a signal having a frequency within an operation band, such as the 2.4 GHz Wi-Fi band according to IEEE 802.11. The antenna device 200 comprises a ground element 202 and a radiating element 204 as described above. The radiating element 204 is short-circuited to the ground element 202 by shorting pin 206.

A positive feed 208 connects a signal conductor 210 to the radiating element 204. A ground feed 212 is connected to a cable ground 214 coupled to the ground element by a capacitive element 216. The capacitive element 216 may be a single capacitor, multiple capacitors in parallel or a more complex capacitive filter network.

The capacitive element 216 is a substantially open circuit for signals having a frequency lower than the operation band. At the same time the capacitive element 216 is a substantially short circuit for signals having a frequency within or higher than the operation band.

The antenna device 200 further comprises a proximity sensor 218 coupled to the ground element 202. This way the ground element 202 forms an electrode to allow the proximity sensor 218 to capacitively sense whether an object is in proximity of the electrode, such as by measuring the capacitance of the ground element 202.

The capacitive reactance is inversely proportional to the signal frequency f. As a result, capacitors act as short circuits for infinitely high frequencies and as open circuits for static signals, such as DC. Between these two extremes, the behaviour of the capacitor is characterised by a function of the frequency and the capacitance.

The capacitance of capacitor 216 is chosen such that the functionality of the radiating element 204 is guaranteed at the operation band of the antenna device 200 while keeping a DC or low frequency separation.

The capacitor 216 is a substantially open circuit for signals having a frequency below the operation band, such that a small amount of parasitic current may flow through the capacitor 216 at low frequencies but that amount is negligible for the operation of the ground element 202 as a floating electrode. In this way the discharge of the ground element caused by the parasitic current flow through capacitor 216 is much slower, such as 100 s, than a typical change of capacitance caused by an object moving in the proximity of the antenna device.

Similarly, the capacitor 216 is a substantially short circuit for signals having a frequency within or higher than the operation band. There may be a small loss due to the capacitor 216 but this loss is negligible for the operation of the radiation element 204.

When using the ground element 202 for proximity sensing, the changes in the proximity of objects is slow and these changes can be regarded as static DC levels on ground element 202. Without connection to the proximity sensor 218 the ground element 202 is essentially floating and the ground element 202 is not connected to a defined potential. This floating characteristic is then exploited by connecting the ground element 202 to proximity sensor 218. This way the ground element 202 forms an electrode for capacitance sensing.

There is a relatively large difference between the frequencies of the operation band of antenna device 200, such as 2.4 GHz and the frequencies of objects moving in the proximity of the antenna device 200, such as 1 Hz. As a result, there is a relatively large frequency range for setting the exact capacitance value.

Figure 3:
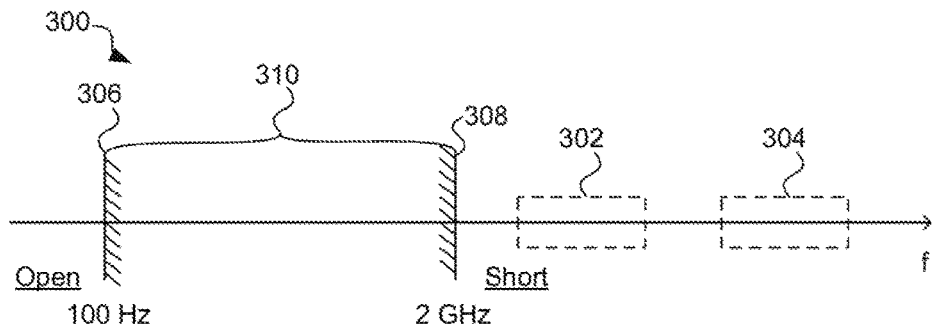
FIG. 3 illustrates an example of a frequency range.

FIG. 3 illustrates one example of a frequency range 300. Frequency range 300 comprises first signal band 302 and second signal band 304. In this example, signals being suppressed or for which capacitor 216 is an open circuit may be signals having a frequency below 100 Hz (indicated at 306). Further, signals being transmitted or for which capacitor 216 is a short circuit may be signals having a frequency higher than 2 GHz (indicated at 308).

Within this large frequency range 310 between 100 Hz and 2 GHz the transmission characteristic of capacitor 216 is insignificant and as a result, there is a large degree of freedom for setting the capacitance value. In one example, the capacitance of capacitor 216 is 4 pF. In examples with multiple parallel capacitors, the sum of capacitances of all capacitors is 4 pF, for example.

Larger capacitances, such as less than 100 pF may also be acceptable on antenna performance but lower capacitances increase the detecting range of the proximity sensor. In one example, the maximum capacitance that the proximity sensor chip can drive is 60 pF. Therefore, the combined capacitance of the ground element 202 and capacitor 216 is less than 60 pF, in this example.

As mentioned above, the proximity sensor 218 is coupled to grounding element 202. In one example, an inductor is used for this coupling and this inductor works essentially in an opposite way as capacitor 216. The inductor is a substantially short circuit for signals having a frequency lower than the operation band of the antenna and the inductor is a substantially open circuit for signals having a frequency within or higher than the operation band. In one example, the inductance value of the inductor is 390 nH.

In one example, the radiating element 204 forms a substantially same plane with the ground element 202, which may result in a planar inverted f antenna (PIFA). Such an antenna device is very thin, which is an advantage when space is limited. For example, the radiating element 204 and the ground element 202 are located directly beneath and parallel to a back wall of a mobile phone.

Figure 4:
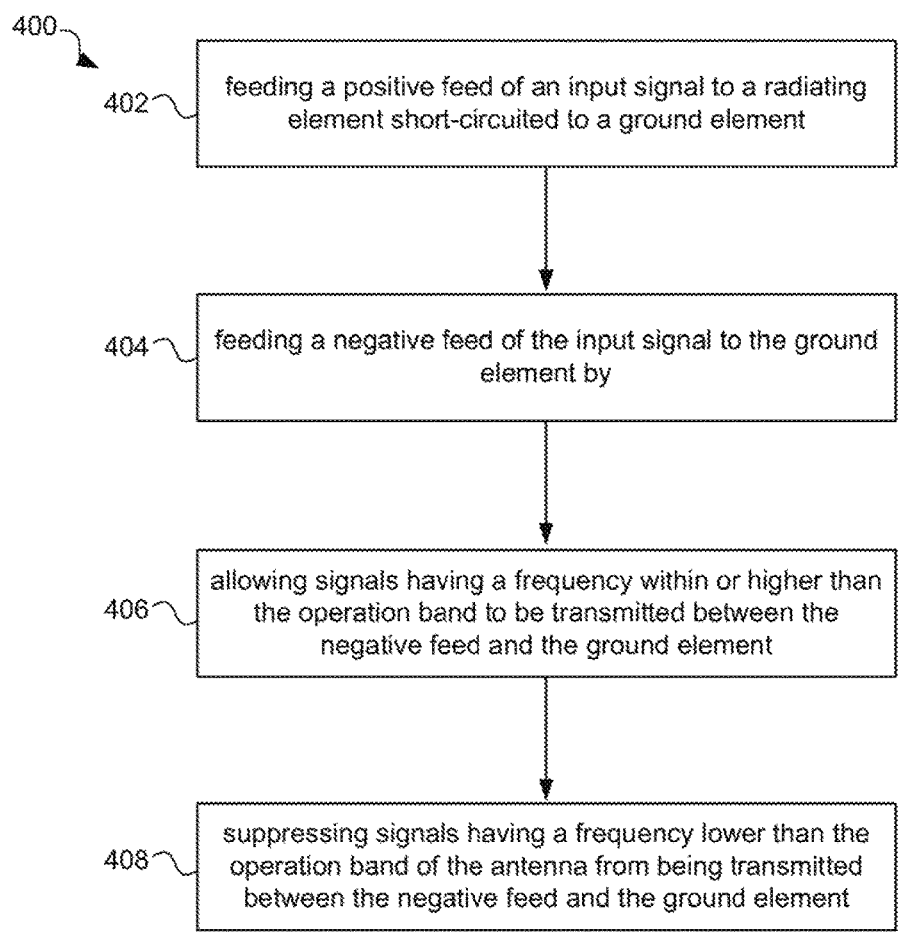
FIG. 4 illustrates a method for wireless communication.

FIG. 4 illustrates a method 400 for wireless communication using an operation band. The method 400 will be explained also with reference to FIG. 1. A positive feed 118 of an input signal is fed 402 to a radiating element 106 short-circuited to a ground element 104. A negative feed 120 of the input signal is fed 404 to the ground element 104.

This step is performed by allowing 406 signals having a frequency within or higher than the operation band to be transmitted between the negative feed 120 and the ground element 104 and also suppressing 408 signals having a frequency lower than the operation band of the antenna from being transmitted between the negative feed 120 and the ground element 104.

Although the concept of using the antenna ground as a sensing electrode is described with reference to a Wi-Fi antenna, it is equally applicable to other antennas and in particular, to Bluetooth antennas operating in bands between 2400 and 2483.5 MHz according to the Bluetooth Special Interest Group and global positioning system (GPS) antenna such as 1.57542 GHz and 1.2276 GHz.

Figure 5:
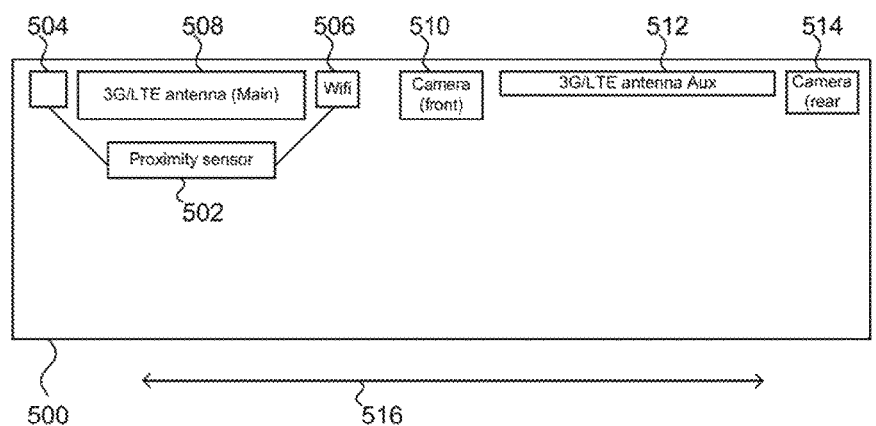
FIG. 5 is a block diagram of components of a communication device.

FIG. 5 is a block diagram of components of a communication device 500. The communication device 500 comprises a proximity sensor 502 connected to an independent sensing electrode 504 and the antenna ground of a Wifi antenna 506 as described above. The communication device 500 further comprises a 3G/LTE main antenna 508, a front-facing camera 510, a 3G/LTE auxiliary antenna 512 and a rear-facing camera 514.

All components, except the proximity sensor 502 are arranged along an x-direction 516 of the device 500. Reducing the number of components along the x-direction, such as by using the Wi-Fi antenna 506 also as a proximity electrode, directly reduces the occupied space in x-direction 516.

In some devices the performance specification of the 3G/LTE antenna 508 is strict and wide band (700 Mhz-2.3 Ghz). As a result, introducing the dual-use concept into the 3G/LTE antenna 508 may result in a more complex and challenging design of the 3G/LTE antenna 508.

Some examples of Wi-Fi or Bluetooth antennas have less strict performance specifications and these antennas operate in a relatively narrow band. Further, the ground element may be smaller than for 3G/LTE antennas.

Therefore, in these examples the Wi-Fi or Bluetooth antenna may be used as a sensor electrode to sense parts the user's body and reduce the output power of a different antenna, such as the 3G/LTE antenna, in order to reduce the SAR value below a pre-define threshold, such as the regulatory limit.

Throughout this specification the word "have", or variations such as "has" or "having", will be understood to have the same meaning as the word "comprise" and to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A communication device comprising:
a first antenna device for a signal having a frequency within an operation band, the first antenna device comprising:
a ground element;
a radiating element short-circuited to the ground element;
a positive feed connected to the radiating element;
a ground feed coupled to the ground element by a capacitive element, the capacitive element is a substantially open circuit for signals having a frequency lower than the operation band and the capacitive element is a substantially short circuit for signals having a frequency within or higher than the operation band; and
a proximity sensor coupled to the ground element such that the ground element forms an electrode to allow the proximity sensor to capacitively sense whether an object is in proximity of the electrode;
a second antenna device; and
an output power controller to selectively reduce output power of a signal applied to the second antenna device in response to the object being sensed by the proximity sensor of the first antenna device.

2. The communication device of claim 1, wherein the output power controller is to selectively reduce an output power of a signal applied to the positive feed in response to the object being sensed by the proximity sensor.

3. The communication device of claim 2, wherein the output power controller is to reduce the output power such that a specific absorption rate value is below a pre-defined threshold.

4. The communication device of claim 1, wherein the operation band is a Wi-Fi band according to IEEE 802.11, a Bluetooth band, or a global positioning system band.

5. The communication device of claim 1, wherein the radiating element is in a same plane as the ground element.

6. The communication device of claim 5, wherein the radiating element and the ground element form a planar inverted-F antenna.

7. The communication device of claim 1, wherein a capacitance of the capacitive element is less than 100 pF.

8. The communication device of claim 7, wherein the capacitance of the capacitive element is 4 pF.

9. A communication device comprising:
a first antenna device for a signal having a frequency within an operation band, the first antenna device comprising:
a ground element;
a radiating element short-circuited to the ground element;
a feed input connected to the radiating element;
a feed ground;
a coupling between the feed ground and the ground element, wherein signals having a frequency lower than the operation band of the first antenna device are suppressed from being transmitted between the feed ground and the ground element, and signals having a frequency within or higher than the operation band are transmitted between the feed ground and the ground element; and a proximity sensor coupled to the ground element such that the ground element forms an electrode to allow the proximity sensor to capacitively sense whether an object is in proximity of the electrode;

a second antenna device; and an output power controller to selectively reduce output power of a signal applied to the second antenna device if the object is sensed by the proximity sensor of the first antenna device.

10. The communication device of claim 9, wherein the first antenna device is a Wi-Fi antenna device or a Bluetooth antenna device; and the second antenna device is a an LTE antenna device.

11. A method comprising:

feeding a positive feed of an input signal to a radiating element short-circuited to a ground element, the radiating element and the ground element being part of a first antenna;

feeding a negative feed of the input signal to the ground element by:

allowing signals having a frequency within or higher than an operation band of the first antenna to be transmitted between the negative feed and the ground element, and suppressing signals having a frequency lower than the operation band of the first antenna from being transmitted between the negative feed and the ground element;

sensing a capacitance of the ground element of the first antenna;

determining a presence of an object based on the sensed capacitance; and selectively reducing an output power of a signal applied to a second antenna in response to the object sensed by the sensed capacitance of the ground element of the first antenna.

12. The method of claim 11, further comprising selectively reducing an input signal power to the positive feed in response to the object sensed by the sensed capacitance of the ground element of the first antenna.

13. The communication device of claim 1, wherein the capacitive element comprises a capacitor.

14. The communication device of claim 1, wherein the ground element is floating at a frequency lower than the operation band.

15. The communication device of claim 1, wherein the proximity sensor is coupled to the ground element through an inductor that is a substantially open circuit for signals having a frequency within or higher than the operation band, and is a substantially short circuit for signals having a frequency lower than the operation band.

16. The communication device of claim 9, wherein the coupling comprises a capacitive element.

17. The method of claim 11, wherein the negative feed is coupled to the ground element by a capacitive element that is a substantially open circuit for signals having a frequency lower than the operation band, and that is a substantially short circuit for signals having a frequency within or higher than the operation band.

18. The communication device of claim 1, wherein the second antenna device has an operation band different from the operation band of the first antenna device.

19. The communication device of claim 9, wherein the second antenna device has an operation band different from the operation band of the first antenna device.

20. The method of claim 11, wherein the second antenna has an operation band different from the operation band of the first antenna.

* * * * *

UNITED STATES PATENT AND TRADEMARK OFFICE
CERTIFICATE OF CORRECTION

PATENT NO. : 10,249,939 B2  
APPLICATION NO. : 15/035073  
DATED : April 2, 2019  
INVENTOR(S) : Chun Chih Chen et al.

Page 1 of 1

It is certified that error appears in the above-identified patent and that said Letters Patent is hereby corrected as shown below:

In Column 7, Line 20, Claim 10, after "is" delete "a".

Signed and Sealed this  
Twenty-seventh Day of August, 2019

Andrei Iancu  
*Director of the United States Patent and Trademark Office*